(12) United States Patent
Shampine

(10) Patent No.: US 9,116,016 B2
(45) Date of Patent: Aug. 25, 2015

(54) INDICATING SYSTEM FOR A DOWNHOLE APPARATUS AND A METHOD FOR LOCATING A DOWNHOLE APPARATUS

(75) Inventor: Rod Shampine, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 231 days.

(21) Appl. No.: 13/174,095

(22) Filed: Jun. 30, 2011

(65) Prior Publication Data

US 2013/0002255 A1    Jan. 3, 2013

(51) Int. Cl.
| | | |
|---|---|---|
| *G01V 3/08* | (2006.01) | |
| *G01D 5/14* | (2006.01) | |
| *E21B 47/09* | (2012.01) | |
| *G01D 5/251* | (2006.01) | |
| *G01V 11/00* | (2006.01) | |

(52) U.S. Cl.
CPC ............ *G01D 5/145* (2013.01); *E21B 47/0905* (2013.01); *G01D 5/2515* (2013.01); *G01V 11/002* (2013.01)

(58) Field of Classification Search
CPC .................................. E21B 47/09; G01V 3/08
USPC ................. 324/323, 326, 327, 345, 346, 351; 175/45, 61, 62; 166/66.5, 250.01, 166/253.1, 255.1, 255.2
See application file for complete search history.

(56) References Cited

U.S. PATENT DOCUMENTS

| | | | |
|---|---|---|---|
| 4,291,761 A * | 9/1981 | Watson ............................ | 166/66 |
| 4,646,042 A * | 2/1987 | Eshelman ..................... | 335/205 |
| 5,509,490 A * | 4/1996 | Paske et al. ...................... | 175/57 |
| 6,991,045 B2 * | 1/2006 | Vinegar et al. .................. | 175/45 |
| 7,174,957 B1 * | 2/2007 | Jokhio ............................. | 166/99 |
| 7,347,261 B2 * | 3/2008 | Markel et al. ............... | 166/255.1 |
| 7,723,974 B1 * | 5/2010 | Venable et al. .................. | 324/67 |
| 7,969,146 B2 * | 6/2011 | Christianson et al. ... | 324/207.24 |
| 2003/0052670 A1 | 3/2003 | Miszewski | |
| 2004/0255479 A1 | 12/2004 | Moake et al. | |
| 2005/0264293 A1 | 12/2005 | Gao et al. | |
| 2006/0232366 A1 * | 10/2006 | Li ................................. | 335/151 |
| 2009/0194333 A1 * | 8/2009 | MacDonald .................... | 175/45 |

FOREIGN PATENT DOCUMENTS

| | | |
|---|---|---|
| RU | 2184844 C1 | 7/2002 |
| WO | 2009064655 A2 | 5/2009 |

OTHER PUBLICATIONS

Antech Ltd, Thru-Riser (Magnetic) Detector, AnTech Ltd online product catalog, Jun. 17, 2013, 2 pages, http://www.antech.co.uk/antech/product-list/mdet.

Grand Illusions, Magnetic Field Paper, online catalog, Jun. 28, 2013, 1 page, http://www.grand-illusions.com/acatalog/Magnetic_Field_Paper.html.

* cited by examiner

*Primary Examiner* — Arleen M Vazquez
*Assistant Examiner* — Robert P Alejnikov, Jr.
(74) *Attorney, Agent, or Firm* — Michael L. Flynn; Timothy Curington; Robin Nava

(57) ABSTRACT

A system for locating a downhole apparatus comprises a wellbore having an interior pressure cavity, wherein the apparatus is disposed in the pressure cavity, a magnetic device for generating a magnetic field in the pressure cavity, and a magnetic field indicator disposed external to the pressure cavity, the magnetic field indicator responsive to the magnetic field in the pressure cavity, wherein the magnetic field is indicative of a position of the apparatus in the pressure cavity.

16 Claims, 7 Drawing Sheets

INDICATING SYSTEM FOR A DOWNHOLE APPARATUS AND A METHOD FOR LOCATING A DOWNHOLE APPARATUS

BACKGROUND

The statements in this section merely provide background information related to the present disclosure and may not constitute prior art.

The present disclosure relates generally to an indicating system and a method for locating a downhole apparatus, and in particular, to a system and a method for locating a downhole apparatus inside a pressure containing system.

In the process of measuring and working on oil and gas wells, downhole tools and coiled tubing are frequently employed. During the use of the downhole tools, various depth measurement systems are employed to track the location of the tools with respect to the surface pressure containing equipment or to features in the well itself. Such surface pressure containing equipment is commonly referred to as a blow out preventer (BOP) stack, generally incorporating one or more BOPs, some length of riser (simple straight pipe), and one or more mechanisms to provide a seal between the BOP stack's pressure barrier and the conveyance method (e.g. coiled tubing, wireline, slickline, jointed pipe, and the like).

As an example, a key underlying measurement method for jointed pipe includes measuring the length of the pipes before they are put into the wellbore. For continuous conveyance methods, two means are generally employed: 1) measuring a rotation of the spool; and 2) pressing a friction wheel against the conveyance means and measuring a rotation to determine an amount of the conveyance means that has moved in or out of the well. Occasionally point markers are employed to indicate a specific location. Such markers include magnetized area, paint, plated on conductive areas, collars, and modifications to the cross section of the conveyance means (such as rolled in grooves or dents).

When a friction wheel is used as the sole means of locating the downhole tool with respect to an internal feature of the well and/or the BOP stack, it is often supplemented by references to a feature of the well such as the location of the casing collars, gamma ray patterns, nipple locations, or tagging the bottom. Any small errors (or permanent changes in the length of the conveyance, such as the increase in length seen in coiled tubing) may accumulate as a downhole tool is run in and out of the well, leading to uncertainty as to when the tool has been pulled back into the BOP stack for removal. This uncertainty can reach hundreds of feet; it is not unheard of to have operators be pulling out of hole at high speed, thinking they are still at significant depths, and then have their tool pulled into the sealing means. This often results in the failure of the joint between the tool and the conveyance means, leading to the dropping of the tool. This is sufficiently common in the wireline and slickline world that "tool traps" are commonly available that latch onto the tool when it is pulled up into them and prevent it from dropping even if the wire fails.

Another key challenge comes during pressure deployment; the tools must be very precisely located relative to the BOP rams so that the rams may be closed on a part of the tool that is prepared for this (commonly called a deployment bar). Missing the appropriate location by a few inches can mean major damage to the tool, dropping the tool, or a blowout. Reverse deployment (removing the tool) is complicated by the uncertainty in the location after the friction wheel errors have accumulated. This can be compensated by gently tagging the sealing mechanism to re-establish the relationship between the tool and the BOP stack.

It is always desirable to provide an indicating system and a method of locating a downhole apparatus disposed in a pressure cavity of a well.

SUMMARY

In one embodiment, a system for locating a downhole apparatus, the system comprises a wellbore having an interior pressure cavity, wherein the apparatus is disposed in the pressure cavity, a magnetic device for generating a magnetic field in the pressure cavity, and a magnetic field indicator disposed external to the pressure cavity, the magnetic field indicator responsive to the magnetic field in the pressure cavity, wherein the magnetic field is indicative of a position of the apparatus in the pressure cavity.

The present disclosure also comprises methods of locating a downhole apparatus.

One method comprises: generating a magnetic field in an interior pressure cavity of a wellbore; passing the apparatus through the pressure cavity of the wellbore; and monitoring at least one of a presence and a magnitude of the magnetic field, wherein the at least one of the presence and the magnitude of the magnetic field is indicative of a location of the apparatus in the pressure cavity.

Another method comprises the steps of: generating a magnetic field in a pressure cavity of a wellbore, the magnetic field extending through a pressure barrier; passing the apparatus through the pressure cavity of the wellbore; and monitoring at least one of a presence and a magnitude of the magnetic field adjacent a pre-determined section of the pressure barrier, wherein the at least one of the presence and the magnitude of the magnetic field is indicative of a location of the apparatus in the pressure cavity.

The main concept of this disclosure takes advantage of differences in the magnetic properties of a downhole apparatus, a conveyance means, and a pressure barrier in order to provide location information.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

Figure 1:
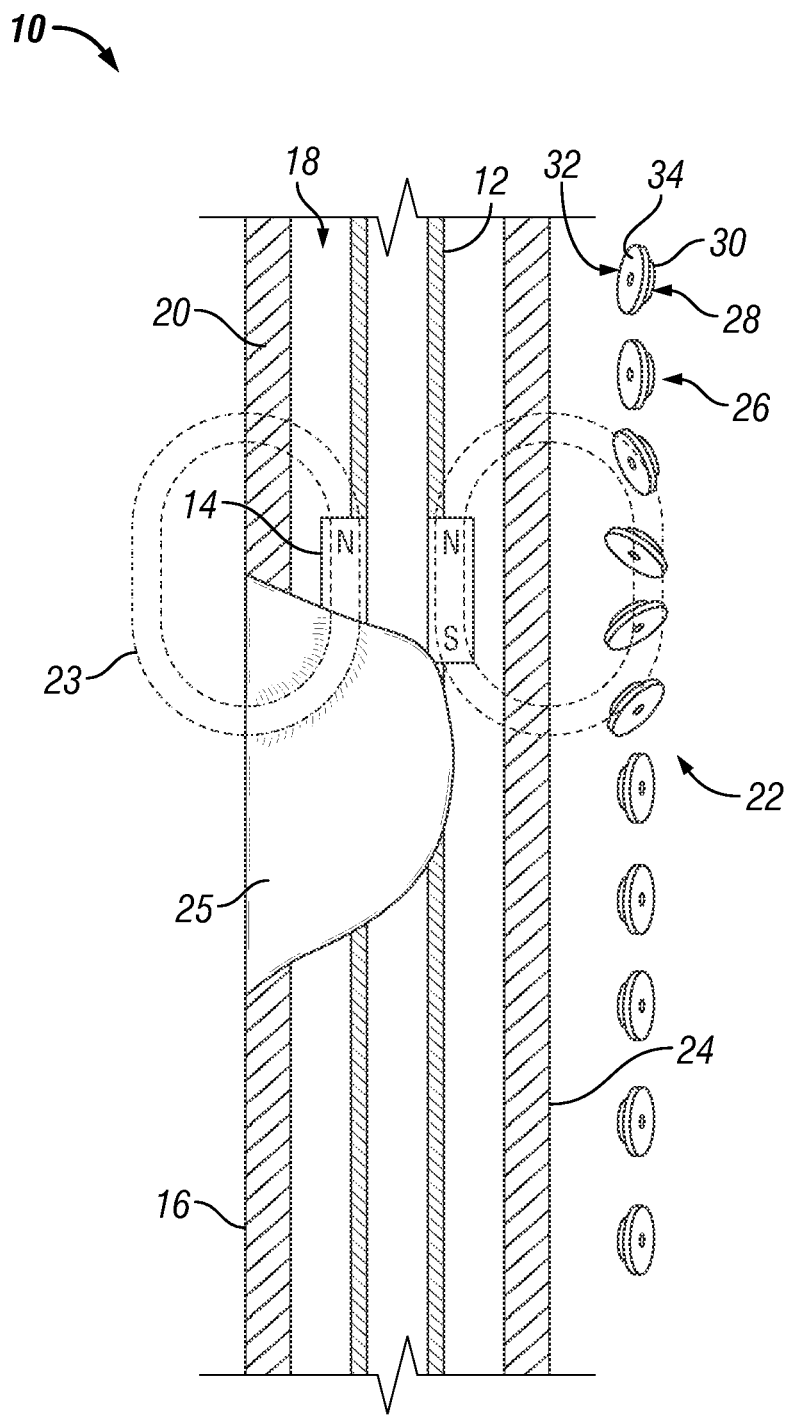
FIG. 1 is a schematic representation of an indicating system according to a first embodiment.

Referring to FIG. 1, an embodiment of an indicating system 10 for an apparatus 12 in a downhole environment is illustrated. As shown, the system 10 comprises one or more magnetic devices 14 (e.g. magnets, magnetic field generators, and the like) coupled to the apparatus 12. Typically, the apparatus 12 is disposed in a wellbore 16 to perform a downhole or an in-bore operation. As a non-limiting example, the apparatus 12 is a wellbore tool or at least a portion of coiled tubing. Typically, the wellbore 16 comprises an interior pressure cavity 18, wherein the apparatus 12 is disposed in the pressure cavity 18. In certain embodiments, the wellbore 16 comprises a pressure barrier 20 or riser to provide a sufficient barrier for maintaining an internal pressure level in the pressure cavity 18. The pressure barrier 20 or riser is typically formed from a non-magnetic material; however, a magnetic material can be used.

The system 10 further comprises a magnetic field indicator 22 disposed external to the pressure cavity 18, which provide a visual indicator of the presence of a magnetic field external to the pressure cavity 18. As a non-limiting example, the magnetic field indicator 22 is responsive to a magnetic field 23 in the pressure cavity 18 (e.g. generated by the magnetic device(s) 14), wherein the magnetic field is indicative of a position of the apparatus 12.

In certain embodiments, the magnetic field indicator 22 comprises a layer of magnetic field indicating material 25 (a portion of which is shown not cut away in FIG. 1) disposed on an outside surface 24 of the pressure barrier 20 to directly indicate the presence of the magnetic device 14 inside the pressure cavity 18. As a non-limiting example, the magnetic field 23 indicating material 25 may be similar to a magnetic field paper available from Grand Illusions in the U.K. at www.grand-illusions.com, a powder used in magnaflux examination, Magne-View Film magnetic indicating film available from Magne-Rite, Inc., or a substance similar to the indicator in the Magna Doodle magnetic drawing toy available from Ohio Art Company of Bryan, Ohio.

In the embodiment shown, the magnetic field indicator 22 may comprise an array of indicator magnets 26 is pivotably disposed on the outside surface 24 of the pressure barrier 20 (or some structure external to the pressure cavity 18). A first side 28 of each of the indicator magnets 26 has a first indicia 30 (e.g. color) disposed thereon and a second side 32 of each of the indicator magnets 26 opposite the first side 28 has a second indicia 34 (distinguishable from the first indicia 30) disposed thereon. It is understood that the magnetic field indicator 22 can be any magnetic field detecting system or device, preferably with a detector system capable of resolving more than one position. As a non-limiting example, Rota Engineering Limited of the U.K. manufactures suitable detectors based on either reed switches or Hall Effect sensors that are available with hazardous area certification. It is understood that hazardous area certification is a significant challenge for any apparatus position indicating systems, as they are in an area where there is a significant chance of there being an explosive mixture present.

In operation, the apparatus 12 is moved through the pressure cavity 18 of the wellbore 16 and the magnetic devices 14 generate the magnetic field 23 that extends from the pressure cavity 18 through the pressure barrier 20 to an area external to the pressure cavity 18. Accordingly, when the apparatus 12 is positioned adjacent to the magnetic field indicator 22 or moved past the magnetic field indicator 22, the magnetic field generated by the magnetic devices 14 causes the magnetic field indicator 22 to identify at least one of a presence of the magnetic field 23 or a change (e.g. change in magnitude) in the magnetic field 23. As a non-limiting example, by passing the apparatus 12 past the array of indicator magnets 26, a pivotal position of each of the indicator magnets 26 is modified, thereby indicating the presence of the magnetic field 23 generated by the magnetic devices 14. As a further non-limiting example, the indicator magnets 26 are disposed adjacent a blow out preventer (BOP) stack (not shown) to indicate a location of the apparatus 12 as the apparatus approaches the BOP stack.

Figure 2:
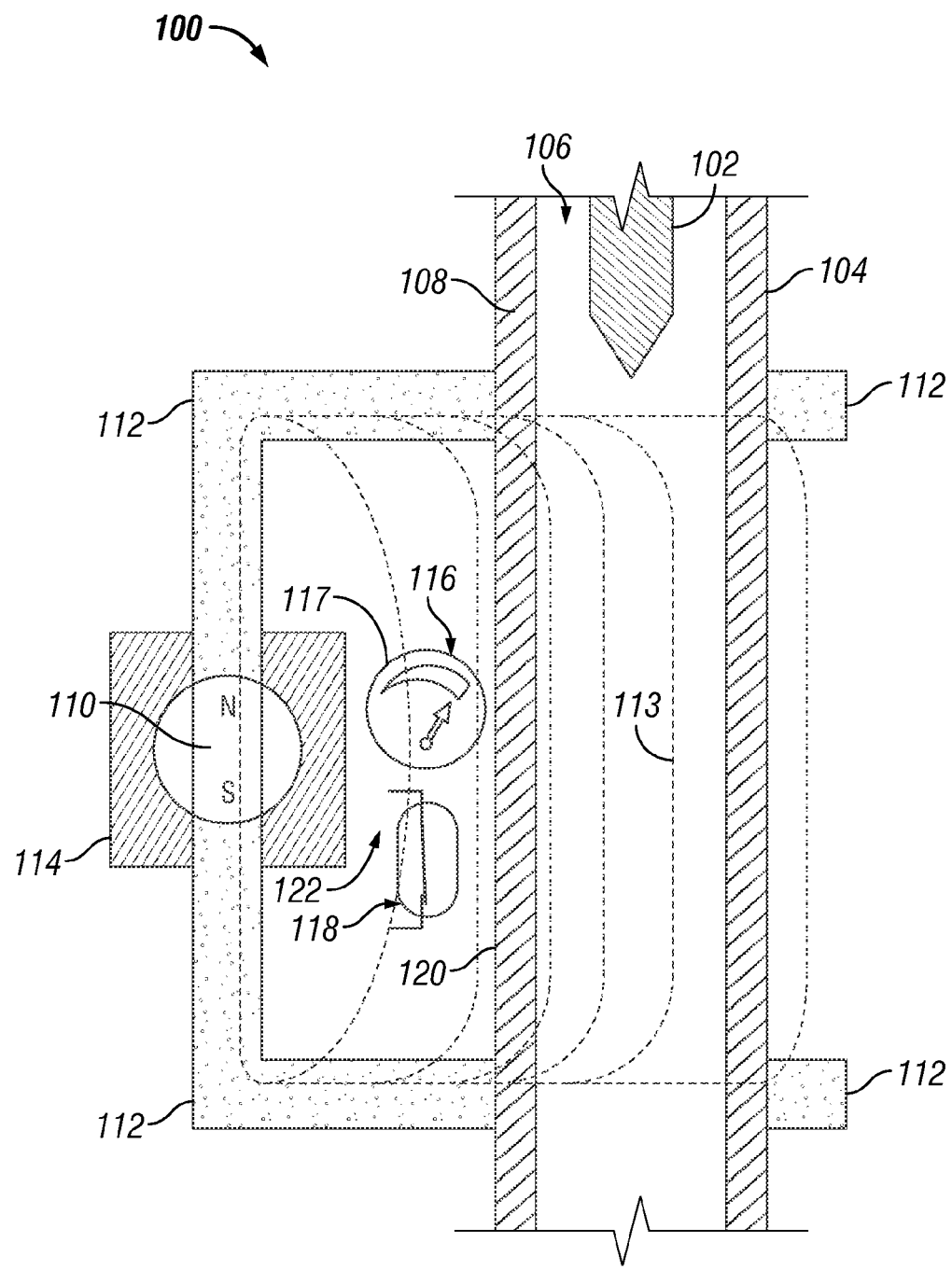
FIG. 2 is a schematic representation of an indicating system according to a second embodiment, showing a magnetic field directed into a pressure cavity of a well bore.

Referring to FIG. 2, an indicating system 100 for an apparatus 102 in a downhole environment is illustrated according to another embodiment. As shown, the apparatus 102 is disposed in a wellbore 104 to perform a downhole or a wellbore operation. As a non-limiting example, the apparatus 102 is a wellbore tool or at least a portion of coiled tubing. Typically, the wellbore 104 comprises an interior pressure cavity 106, wherein the apparatus 102 is disposed in the pressure cavity 106. In certain embodiments, the wellbore 104 comprises a pressure barrier 108 or riser to provide a sufficient barrier for maintaining an internal pressure level in the pressure cavity 106. The pressure barrier 108 or riser is typically formed from a non-magnetic material; however, a magnetic material can be used.

A magnet (or an electromagnet) 110 is disposed in a highly permeable structure 112 and at least a portion of the highly permeable structure 112 is disposed adjacent the pressure barrier 108. In certain embodiments, the highly permeable structure 112 extends circumferentially around at least a portion of the pressure barrier 108. The magnet 110 is arranged to generate a substantial axial magnetic flux (i.e. magnetic field 113) generated in the pressure cavity 106 along a length of the pressure barrier 108. As a non-limiting example, the magnet 110 may be placed in a housing 114 (similar to the housing used on magnetic indicator bases and magnetic lifters known in the art) such that the generated magnetic field 113 may be switched on and off by rotating the magnet 110.

The system 100 further comprises a magnetic field indicator 116 disposed external to the pressure cavity 106. As a non-limiting example, the magnetic field indicator 116 is responsive to a magnetic field in the pressure cavity 106, wherein the magnetic field is indicative of a position of the apparatus 102.

As a non-limiting example, the magnetic field indicator 116 comprises at least one of a magnetic field sensor 117 (or measurement device) and/or a reed relay 118 (i.e. reed switch) disposed adjacent an external surface 120 of the pressure barrier 108 in a location or measuring region 122 where the magnetic field 113 is measureable and of sufficient magnitude to close the contacts on the reed relay 118, as appreciated by one skilled in the art. As a further non-limiting example, the magnetic field sensor 117 can be a passive magnetic field detector (readily available), a Hall effect sensor, a magnetoresistance sensor, a fluxgate magnetometer, or other means of measuring a local magnetic field. In an embodiment, the passive magnetic field sensor 117 may comprise a gauss meter or magnetometer, such the model 2480 available from the Magnaflux Corporation, which advantageously does not require an external power source.

Figure 3:
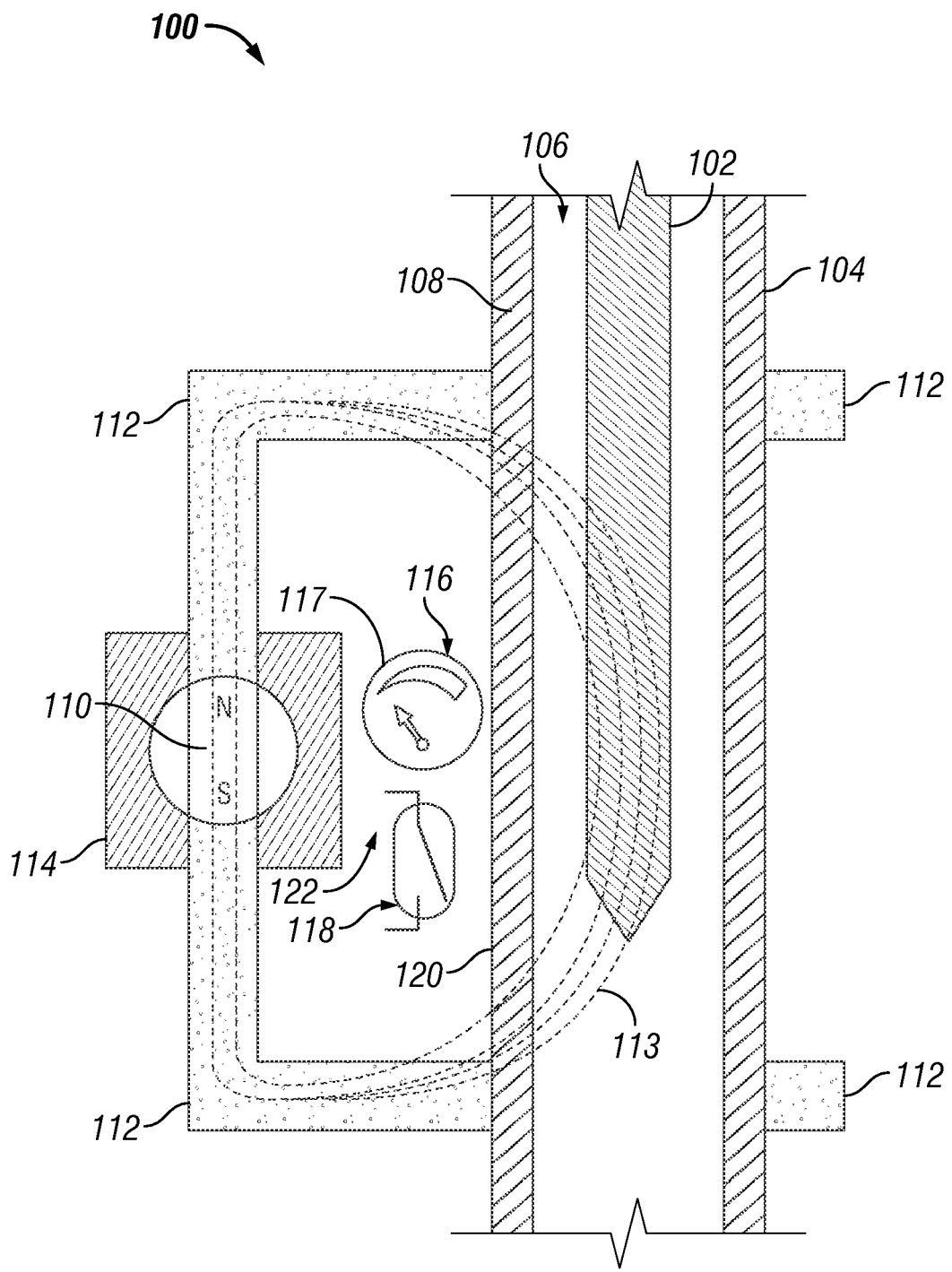
FIG. 3 is a schematic representation of the indicating system of FIG. 2, showing a downhole tool in the magnetic field.

In operation, the apparatus 102 (or any other item having a magnetic permeability that is substantially larger than the medium inside the pressure barrier 108) is moved into the magnetic field 113, as shown in FIG. 3. The apparatus 102 provides a path for the magnetic field 113, thus shunting the magnetic field 113 away from the magnetic field sensor 117, the reed relay 118, and the measuring region 122. The shunting of the magnetic field 113 causes the reed relay 118 to open and a reading or measurement of the magnetic field sensor 117 is changed. The toggling of the reed relay 118 and/or the change in the measurement of the magnetic field sensor 117 is indicative of the apparatus 102 being positioned or moved through the magnetic field 113, thereby indicating a location of the apparatus 102. It is understood that a magnetic device (not shown) can be coupled to the apparatus 102 to maximize a change in the measurement or reading presented by the magnetic field sensor 117. It is further understood that the magnet 110 may be substituted with an inductive coil (not shown). A measurement of an alternating current applied to the coil may be used to indicate any change in an inductance due to the presence of the apparatus within the magnetic field 113, as is understood by one skilled in the art.

Figure 4:
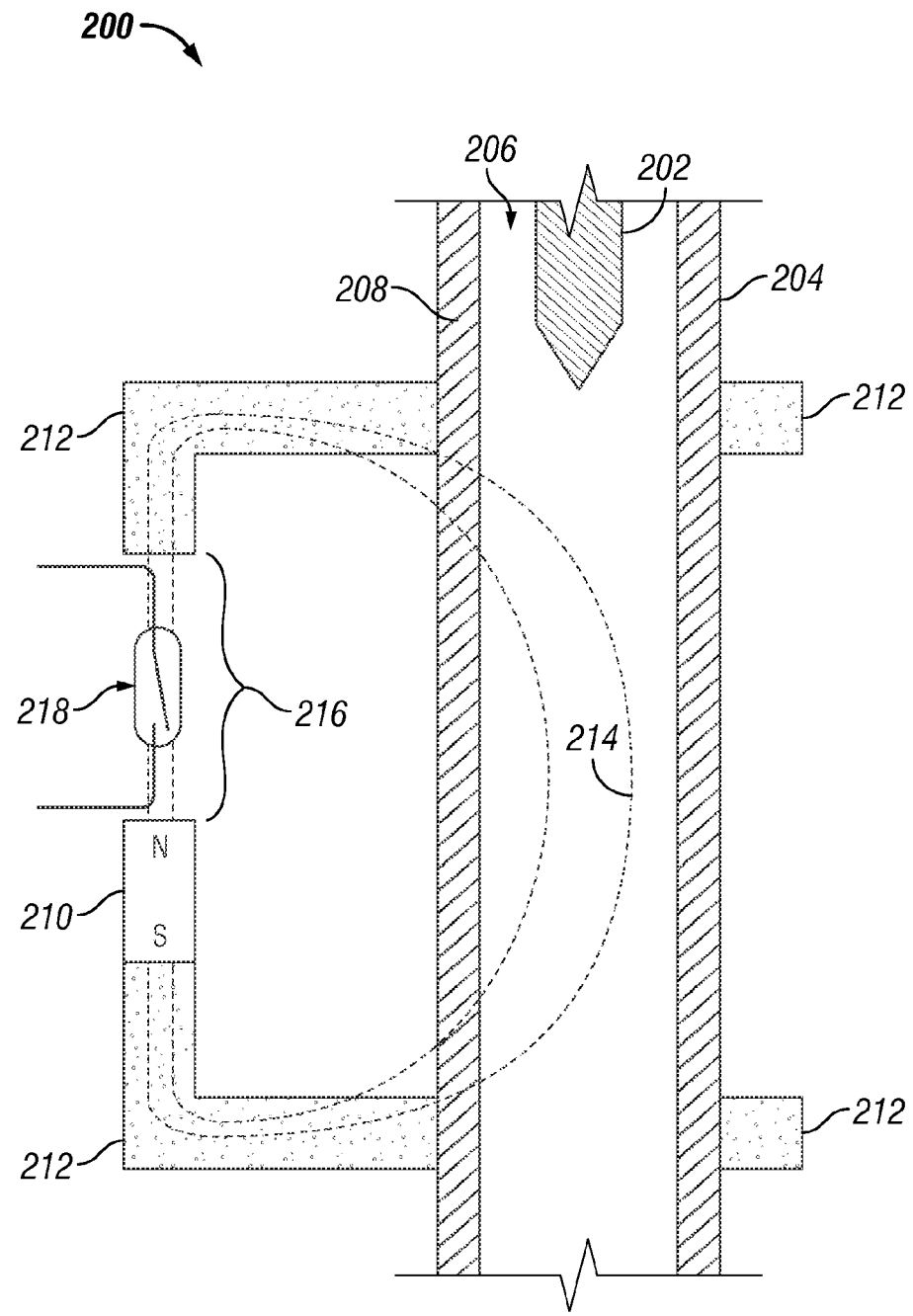
FIG. 4 is a schematic representation of an indicating system according to a third embodiment, showing a magnetic field directed into a pressure cavity of a well bore.

Referring to FIG. 4, an indicating system 200 for an apparatus 202 in a downhole environment is illustrated according to another embodiment. As shown, the apparatus 202 is disposed in a wellbore 204 to perform a downhole or an wellbore operation. As a non-limiting example, the apparatus 202 is a wellbore tool or at least a portion of coiled tubing. Typically, the wellbore 204 comprises an interior pressure cavity 206, wherein the apparatus 202 is disposed in the pressure cavity 206. In certain embodiments, the wellbore 204 comprises a pressure barrier 208 or riser to provide a sufficient barrier for maintaining an internal pressure level in the pressure cavity 206. The pressure barrier 208 or riser is typically formed from a non-magnetic material; however, a magnetic material can be used.

A magnet (or an electromagnet) 210 is disposed adjacent a highly permeable structure 212 and at least a portion of the highly permeable structure 212 is disposed adjacent the pressure barrier 208. In certain embodiments, the highly permeable structure 212 extends circumferentially around at least a portion of the pressure barrier 208. The magnet 210 is arranged to generate a substantial axial magnetic flux (i.e. magnetic field 214) generated in the pressure cavity 206 along a length of the pressure barrier 208. As a non-limiting example, the magnet 210 may be placed in a housing (not shown) such that the generated magnetic field 214 may be switched on and off by rotating the magnet 210.

As shown, a gap 216 or spacing is formed in the highly permeable structure 112 along a path of the magnetic field 214. A reed relay 218 (or a magnetic field sensor) is disposed in the gap 216 and the magnetic field generated 214 by the magnet is adjusted such that the reed relay 218 is toggled to a closed position when exposed to a magnitude of the magnetic field 214 below a calibratable threshold value.

Figure 5:
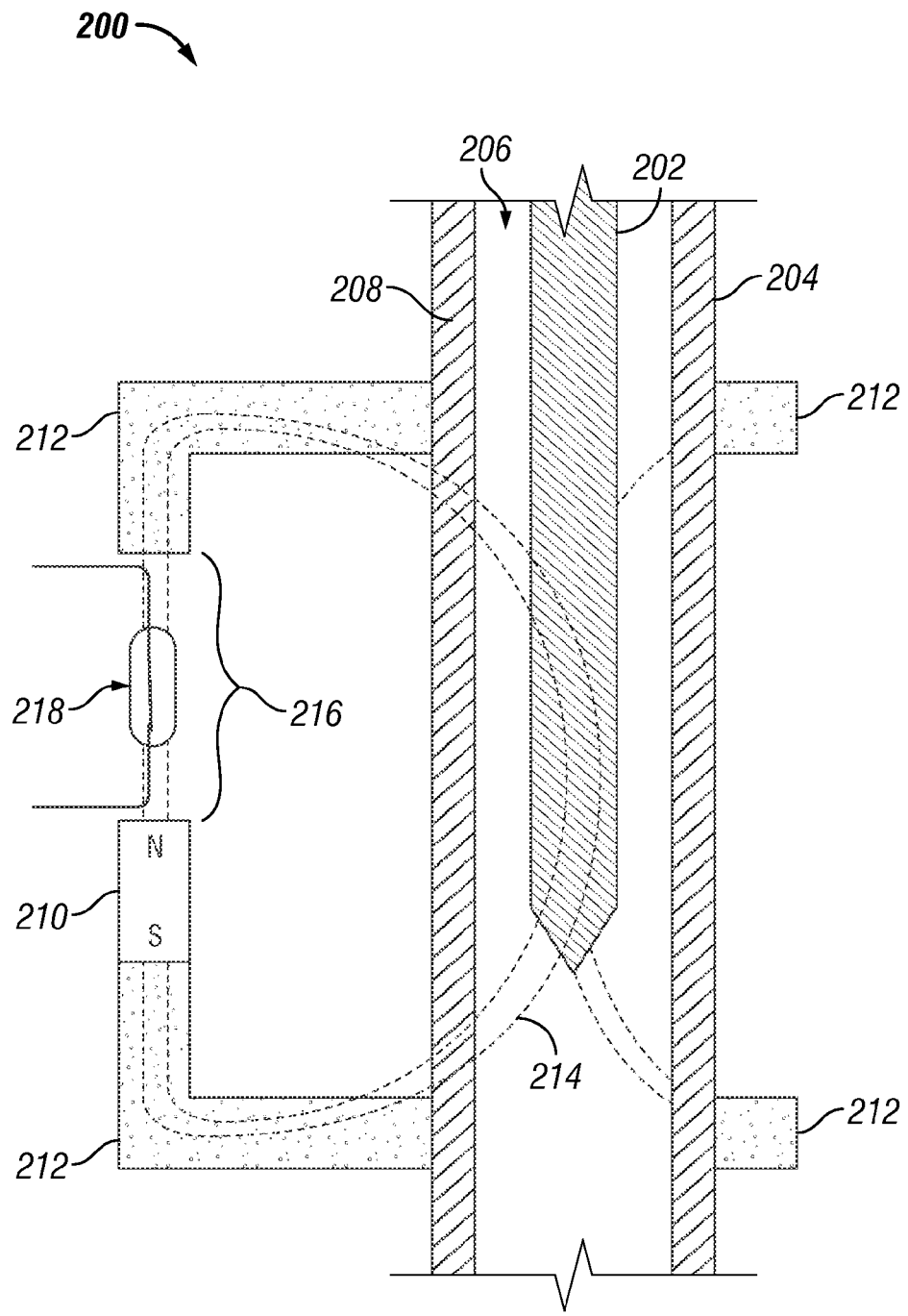
FIG. 5 is a schematic representation of the indicating system of FIG. 4, showing a downhole tool in the magnetic field.

In operation, the apparatus 202 (or any other magnetic item) is moved into the magnetic field 214, as shown in FIG. 5. The apparatus 202 provides a path for the magnetic field 213, thus shunting the magnetic field 214 and causing the reed relay 218 to close. The toggling of the reed relay 218 is indicative of the apparatus 202 being positioned or moved through the magnetic field 214, thereby indicating a location of the apparatus 202. It is understood that the magnet 210 may be substituted with an inductive coil (not shown). A measurement of an alternating current applied to the coil may be used to indicate any change in an inductance due to the presence of the apparatus 202 within the magnetic field 214, as is understood by one skilled in the art.

Figure 6:
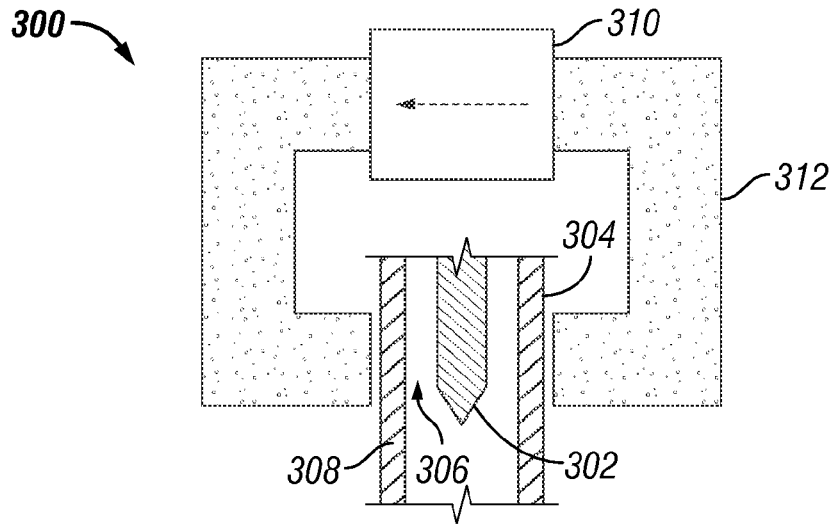
FIG. 6 is a schematic representation of an indicating system according to a fourth embodiment.

Referring to FIG. 6, an indicating system 300 for an apparatus 302 in a downhole environment is illustrated according to another embodiment. As shown, the apparatus 302 is disposed in a wellbore 304 to perform a downhole or an in-bore operation. As a non-limiting example, the apparatus 302 is a wellbore tool or at least a portion of coiled tubing. Typically, the wellbore 304 comprises an interior pressure cavity 306, wherein the apparatus 302 is disposed in the pressure cavity 306. In certain embodiments, the wellbore 304 comprises a pressure barrier 308 or riser to provide a sufficient barrier for maintaining an internal pressure level in the pressure cavity 306. As shown, the pressure barrier 308 or riser is formed from a magnetic material.

A magnet 310 (or a magnetic field generator including a plurality of magnets or coils) is disposed adjacent a highly permeable structure 312 and at least a portion of the highly permeable structure 312 is disposed adjacent the pressure barrier 308. In certain embodiments, the highly permeable structure 312 extends circumferentially around at least a portion of the pressure barrier 308. The magnet 310 is arranged to generate a substantial magnetic field 313 (FIG. 7) through the highly permeable structure 312 and the pressure barrier 308. As a non-limiting example, the magnet 310 may be placed in a housing (not shown, but similar to the housing 114 used on magnetic indicator bases and magnetic lifters known in the art) such that the generated magnetic field 313 may be switched on and off by rotating the magnet 310. In certain embodiments, laminations are applied to the highly permeable structure 312 to suppress eddy currents, as understood by one skilled in the art.

Figure 7:
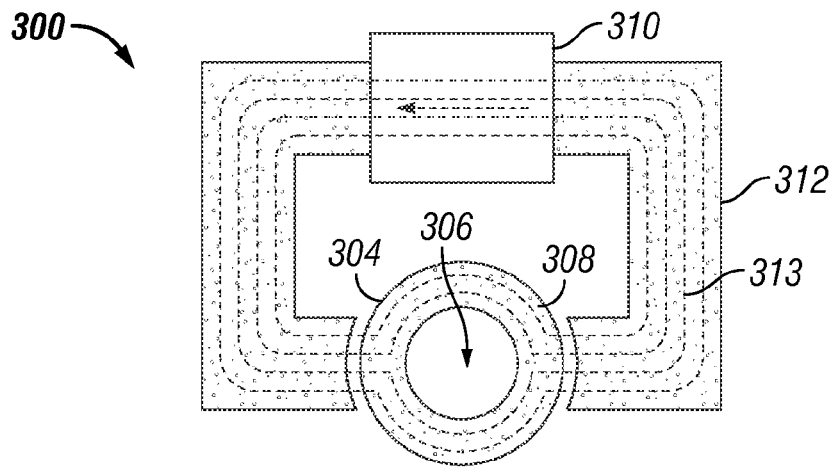
FIG. 7 is a schematic representation of the indicating system of FIG. 6, showing a magnetic field directed through a pressure barrier of a well bore.

FIG. 7 illustrates a path of the magnetic field 313 as the magnetic field 313 passes through the highly permeable structure 312 and the pressure barrier 308, wherein a flux of the magnetic field 313 is below the saturation flux in the pressure barrier 308.

Figure 8:
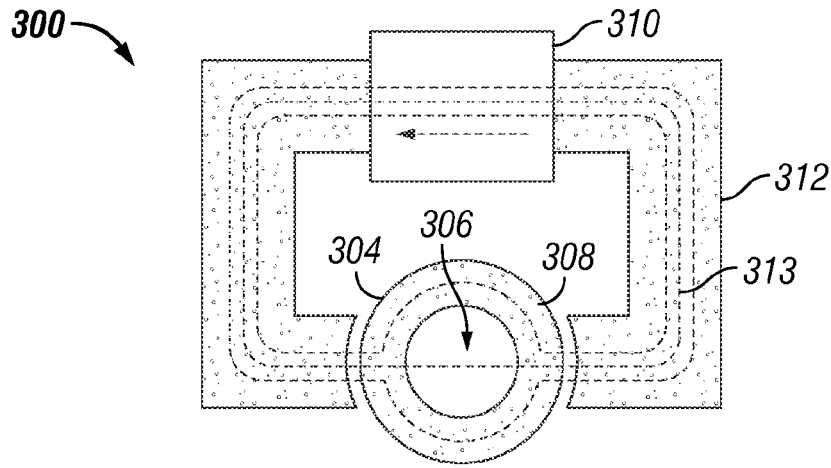
FIG. 8 is a schematic representation of the indicating system of FIG. 6, showing a magnetic field directed through a saturated pressure barrier of a well bore.

FIG. 8 shows a flux path when the magnetic flux in the pressure barrier 308 is higher than the saturation flux of the barrier material (but less than the saturation of the highly permeable structure 312). As shown, the magnetic field 313 passes through the pressure barrier 308 and across the pressure cavity 306. Therefore, either a magnetic flux or an inductance can be measured to determine if the apparatus 302 is present in the magnetic field 313 passing through the pressure cavity 306, thereby locating the apparatus in the pressure cavity 306.

Figure 9:
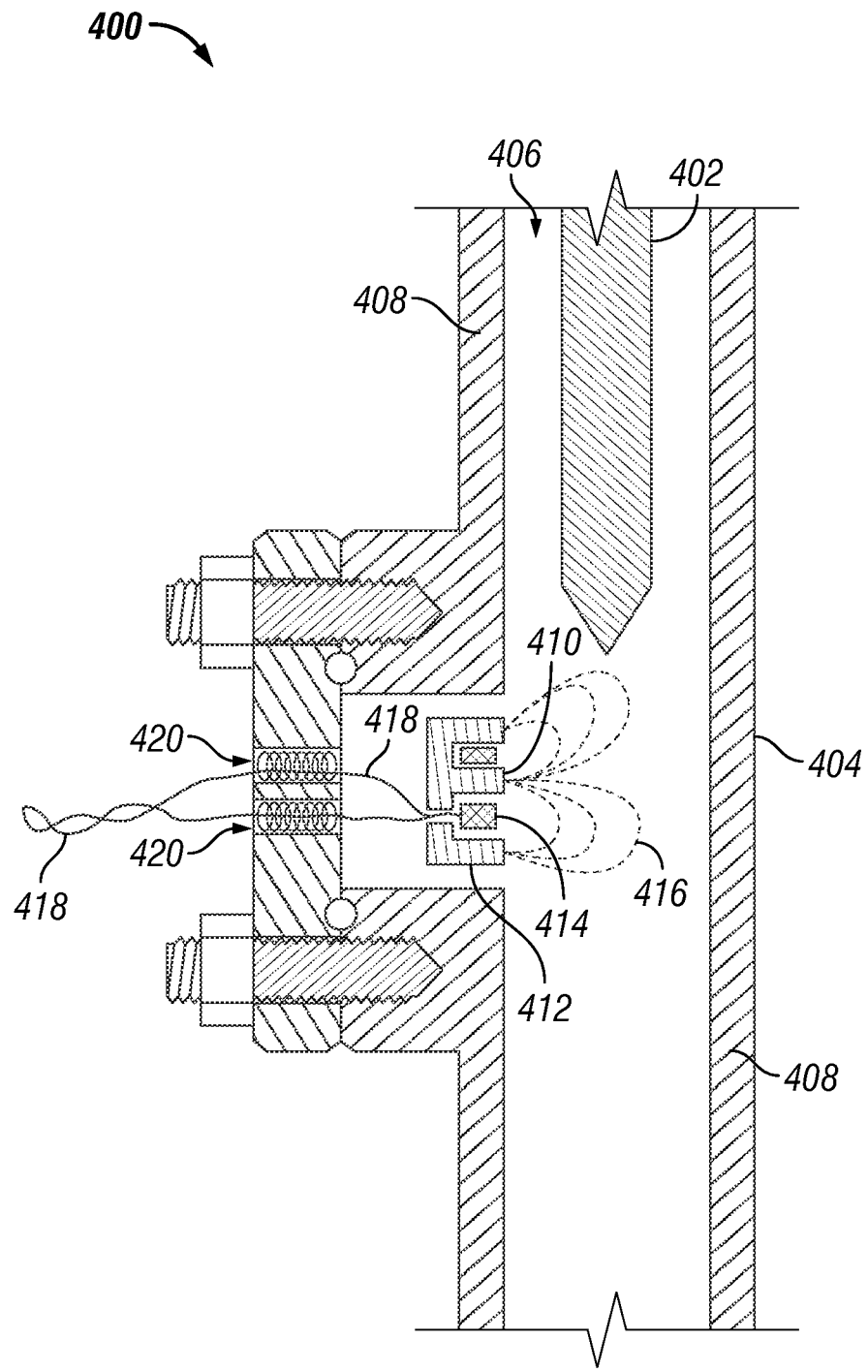
FIG. 9 is a schematic representation of an indicating system according to a fifth embodiment, showing a magnetic field directed into a pressure cavity of a well bore.

Referring to FIG. 9, an indicating system 400 for an apparatus 402 in a downhole environment is illustrated according to another embodiment. As shown, the apparatus 402 is disposed in a wellbore 404 to perform a downhole or an in-bore operation. As a non-limiting example, the apparatus 402 is a wellbore tool or at least a portion of coiled tubing. Typically, the wellbore 404 comprises an interior pressure cavity 406, wherein the apparatus 402 is disposed in the pressure cavity 406. In certain embodiments, the wellbore 404 comprises a pressure barrier 408 or riser to provide a sufficient barrier for maintaining an internal pressure level in the pressure cavity 406. As shown, the pressure barrier 408 or riser is formed from a magnetic material.

The system 400 further comprises a magnetic field indicator 410 disposed in the pressure cavity 406. As a non-limiting example, the magnetic field indicator 410 is responsive to a magnetic field in the pressure cavity 406, wherein the magnetic field is indicative of a position of the apparatus 402. As shown, the magnetic field indicator 410 comprises a magnetic core 412 with a winding 414 to generate a magnetic field 416 in the pressure cavity 406. A plurality of conductive wires 418 are in electrical communication with the winding 414 and extend through the pressure barrier 408 via a plurality of high pressure electrical feed-throughs 420.

In operation, the magnetic field indicator 410 is energized to produce the magnetic field 416 in the pressure cavity 406. Therefore, either a magnetic flux or an inductance can be measured to determine if the apparatus 402 is present in the magnetic field 416 in the pressure cavity 406, thereby locating the apparatus in the pressure cavity 406.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. As a non-limiting example, other magnetic field indicators can be used such as a Hall/magnetoresistive sensor with bias magnet, an inductive proximity sensor, a capacitive proximity sensor, an optical or magnetic interrupter, etc. Accordingly, the foregoing description should not be read as pertaining only to the precise structures described and shown in the accompanying drawings, but rather should be read as consistent with and as support for the following claims, which are to have their fullest and fairest scope.

I claim:

1. A system for locating a downhole apparatus, the system comprising:
   a wellbore having an interior pressure cavity, wherein the downhole apparatus is disposed in the pressure cavity;
   a pressure barrier disposed in the wellbore and defining the interior pressure cavity;
   a magnetic device physically coupled to the downhole apparatus for generating a magnetic field in an interior pressure cavity of a wellbore by passing the downhole apparatus and the magnetic device coupled thereto through the interior pressure cavity; and
   a magnetic field indicator disposed external to the pressure cavity, the magnetic field indicator responsive to the magnetic field in the pressure cavity, wherein the magnetic field is indicative of a position of the apparatus in the pressure cavity, and wherein the apparatus is configured to pass through the interior pressure cavity to perform a downhole or in-bore operation.

2. The system according to claim 1, wherein the pressure barrier is formed from a magnetic material or a non-magnetic material. at least a portion of the permeable structure.

3. The system according to claim 1, wherein the magnetic field indicator comprises at least one indicator visible external to the pressure cavity.

4. The system according to claim 1, wherein the magnetic field indicator comprises at least one of a passive magnetic field detector, a Hall effect sensor, a magnetoresistance sensor, and a fluxgate magnetometer.

5. The system according to claim 1, wherein the magnetic field indicator comprises a reed relay that is automatically actuated in response to a predetermined magnitude of the magnetic field.

6. The system according to claim 1, wherein the apparatus comprises a wellbore tool or a coiled tubing.

7. The system according to claim 1, wherein the magnetic field indicator comprises an array of indicators, each of the indicators operable to be modified to indicate progress of the apparatus through the pressure barrier.

8. The method according to claim 7, wherein the array of indicators are disposed adjacent a blow out preventer (BOP) stack to indicate a location of the apparatus as the apparatus approaches the BOP stack.

9. A method for locating a downhole apparatus, comprising:
   physically coupling a magnetic device to the downhole apparatus;
   generating a magnetic field in an interior pressure cavity of a wellbore by passing the downhole apparatus and the magnetic device coupled thereto through the pressure cavity of the wellbore;
   monitoring at least one of a presence and a magnitude of the magnetic field, wherein the at least one of the presence and the magnitude of the magnetic field is indicative of a location of the apparatus in the pressure cavity; and
   providing an indication that the downhole apparatus is located with the pressure cavity.

10. The method according to claim 9, wherein providing an indication comprises providing an array of indicators, each of the indicators operable to be modified to indicate progress of the apparatus through the pressure barrier.

11. The method according to claim 10, wherein the array of indicators are disposed adjacent a blow out preventer (BOP) stack to indicate a location of the apparatus as the apparatus approaches the BOP stack.

12. A method for locating a downhole apparatus disposed in a pressure cavity of a wellbore, the wellbore including a pressure barrier defining the pressure cavity, the method comprising:
   attaching physically a magnet to the downhole apparatus;
   generating a magnetic field with the magnet in the pressure cavity of the wellbore by passing the downhole apparatus through the pressure cavity of the wellbore, the magnetic field extending through the pressure barrier;
   monitoring at least one of a presence and a magnitude of the magnetic field adjacent a pre-determined section of the pressure barrier; and
   indicating the location of the apparatus in the pressure cavity with a magnetic field indicator.

13. The method according to claim 12, wherein the pressure barrier is formed from a magnetic material or a non-magnetic material.

14. The method according to claim 12, wherein monitoring at least one of the presence and the magnitude of the magnetic field adjacent a pre-determined section of the pressure barrier is executed by a toggling of a reed relay.

15. The method according to claim 12, wherein indicating comprises providing an indication with an array of indicators, each of the indicators operable to be modified to indicate progress of the apparatus through the pressure barrier.

16. The method according to claim 15, wherein the array of indicators are disposed adjacent a blow out preventer (BOP) stack to indicate a location of the apparatus as the apparatus approaches the BOP stack.

* * * * *